Figure 1:
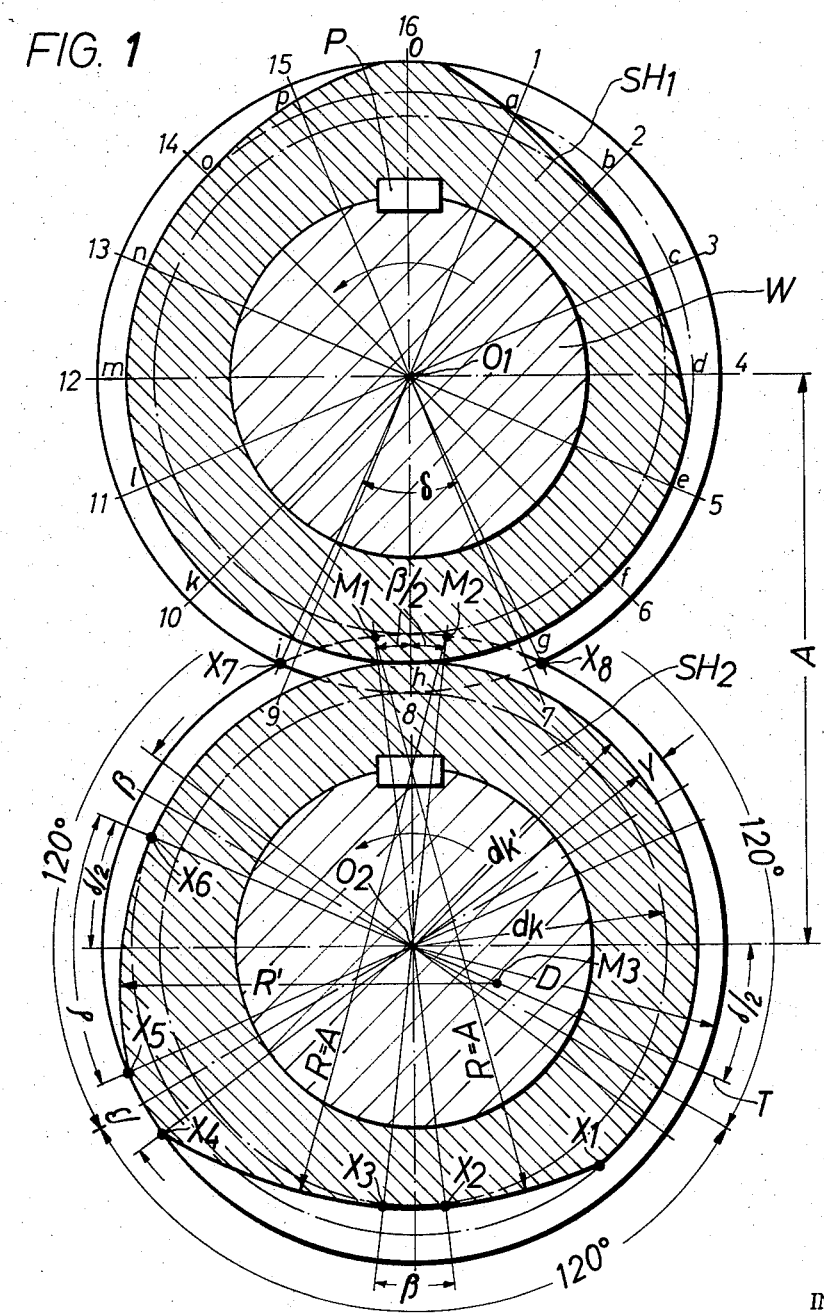

June 7, 1966   R. ERDMENGER   3,254,367
SCREW APPARATUS
Filed March 26, 1963   2 Sheets-Sheet 1

INVENTOR.
RUDOLF ERDMENGER
BY
ATTORNEYS

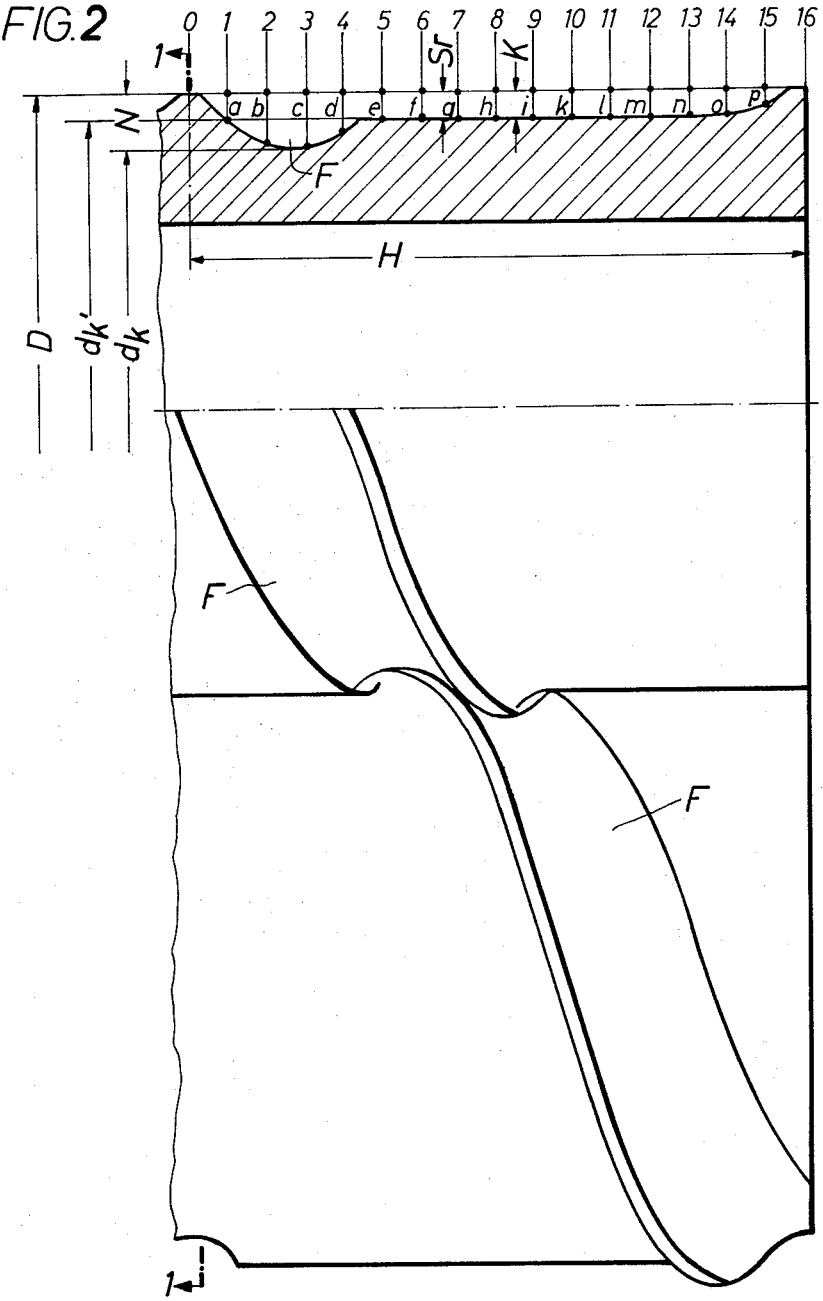

United States Patent Office 3,254,367
Patented June 7, 1966

3,254,367
SCREW APPARATUS
Rudolf Erdmenger, Bergisch-Gladbach, Germany, assignor to Farbenfabriken Bayer Aktiengesellschaft, Leverkusen, Germany, a German corporation
Filed Mar. 26, 1963, Ser. No. 268,158
Claims priority, application Germany, Apr. 11, 1962, F 36,528
3 Claims. (Cl. 18—12)

The invention relates to a screw apparatus having two or more adjacent intermeshing screws turning in the same direction, the threads of these screws being preferably cut on interchangeable sleeves which are fixed on the drive shafts.

Any given machine may thereby easily and quickly be adapted to any given task while maintaining the distance between the axes of the screws and maintaining the bores of the housings, which are not easily variable.

One disadvantage that was hitherto encountered in apparatuses of this type was that it was only possible to vary the dimensions lying in the axial direction, i.e. the screw pitch, the width of the kneading sets etc., but not the dimension lying transversely to the axis, e.g. the thickness of the layer of material used, which often has an important effect on the transfer of heat or the transfer of material or the course of the reaction. This is determined by the radial depth of the screw threads, that is to say, since their outer and inner diameters make contact with each other alternately, by the distances between the axis and by the bores through the housing. It is therefore not possible to alter the thickness of the whole layer of material enclosed in the given screw thread without making an important change in the construction of the machine, and in particular it is not possible to reduce the thickness of this layer, which in practice is the most important alteration.

It has now been found that it is possible to reduce the thickness of the major part of the layer of material in the screw apparatus without altering the basic dimensions (axial distance, bores) if, in accordance with the invention, the internal diameter of each screw thread is made to correspond to the distance between the axes of shafts of the screws and is provided with a spiral groove the axial dimension of which is a fraction of the screw pitch, and the thread comb of the adjacent screw is made to engage without a gap in this spiral groove. At the points where the internal diameter of the interchangeable screw sleeve is increased, the thickness of the layer of material between the housing and the internal diameter is reduced. The smaller the number of thread combs provided per pitch and the narrower these combs which engage in the spiral groove are, the greater will be the proportion of surface area of the layer of material which is now reduced in thickness.

Extending over 75% of the area of the material enclosed in this new type of screw, the thickness of the layer of material is only half its previous value.

Since the products being worked up in the screw threads are moved in different directions along different planes to mix adjacent portions of material, the proportion of unreduced layer in the spiral groove would not substantially diminish the advantage obtained by the new type of screw.

A constructional embodiment of the invention is shown diagrammatically in the drawings.

FIGURE 1 is a cross section through two intermeshing screw sleeves $SH_1$ and $SH_2$ which rotate in the same direction and at the same angular velocity. These sleeves are replaceably mounted on the shafts W by means of fitting keys P.

The upper part of FIGURE 2 is a longitudinal section through the upper sleeve and the lower part is a side view of the zone where the two screw sleeves are in engagement.

The cross section of each of the two screw sleeves $SH_1$ and $SH_2$ is limited by the internal diameter which bears the relationship to A the distance between the axes of the screw sleeves and the outer diameter D of the screws of $$\frac{D+d_K}{2}=A$$

wherein A designates the distance between the axes of the screw sleeves. This internal diameter $d_K$ is intersected by two radii $R=A$ whose centres $M_1$, $M_2$ lie on the outer diameter D of the screw sleeves and enclose with the centre $O_2$ (axis of rotation) of the screw sleeve $SH_2$ a small sector of an angle $\beta$ of preferably about 12° C. The line $x_1$–$x_2$ is thus a circular arc with a radius $R=A$ and centre $M_1$. The connecting line $x_2$–$x_3$ is a circular arc with a radius $$R=\frac{D}{2}-2y$$

and centre $O_2$. The line $x_3$–$x_4$ is again a circular arc with a radius $R=A$ and centre M. $x_4$ lies on the outer diameter D of the screw sleeve $SH_2$. The line $x_4$–$x_5$ is a circular arc with a radius $$R=\frac{D}{2}$$

and centre $O_2$. The points $x_4$ and $x_5$ enclose a sector angle $\beta$. The line $x_5$–$x_6$ is a circular arc with a radius R' which is approximately 0.6D, and the centre of the arc, $M_3$, lies on a tranversal T which is at an angle $\delta/2$ to the horizontal. An angle of $\delta$ is formed by the points of intersection $x_7$ and $x_8$ of the two outer diameters of the screw sleeves with centre $O_1$ or $O_2$. The cross section of the screw sleeve $SH_1$ is identical with that of the screw sleeve $SH_2$, but it is a mirror image of it and is rotated through 120° C. relative to the position of $SH_2$. The cross sectional surfaces shown in the figure and described touch each other on the periphery in every position during one rotation. It follows from this that screw sleeves having such cross-sectional profiles scrape each other's surface.

In the upper part of FIGURE 2, N represents the layer of material in a screw system in which the diameter of each screw is D and the distance between the screw axes is A.

The layer of material K, which is reduced in thickness in accordance with the invention, is half as thick as the layer of material N of the system determined by the axial distances and the bores in the housing with the exception of the zone of the groove F. The longitudinal profile of the screw sleeve according to FIGURE 2 is obtained by transferring the lengths $a$ to $p$ which are measured in FIGURE 1 on the radii 1 to 16 from the outer diameter D to the boundary of the cross-section of the core of the screw. The internal diameter of the system according to the invention is $d_k l$ and the internal diameter of the original system is $d_k$. The relationship between $d_k$ and A is given by the equation $$\frac{D+d_k}{2}=A$$

I claim:
1. A screw apparatus which comprises a pair of screw sleeve members disposed for rotation in the same direction about parallel axes with their respective screw threads intermeshing, said screw sleeve members each being dis- posed for removable mounting upon a corresponding drive shaft for rotation thereby, each of said screw sleeve members being provided with a spiral groove having an axial dimension less than that of the screw pitch, said screw sleeve members being disposed for rotation about parallel axes spaced for scraping contact engagement between the spiral groove of one screw sleeve member and the thread comb of the other.

2. The apparatus according to claim 1, wherein each of said screw sleeve members is provided with means for locking the same to its respective drive shaft to permit rotary movement thereby and to prevent relative movement therebetween.

3. The apparatus according to claim 1, wherein the depth of the spiral groove in each screw sleeve member varies along its spiral path.

References Cited by the Examiner

UNITED STATES PATENTS

| | | | |
|---|---|---|---|
| 2,048,286 | 7/1936 | Pease | 18—12 |
| 2,543,307 | 2/1951 | Swallow et al. | 18—12 |
| 2,674,104 | 4/1954 | Street | 18—12 |
| 2,686,336 | 8/1954 | Kleinlein et al. | 18—12 |
| 2,916,769 | 12/1959 | Baigent | 18—12 |

FOREIGN PATENTS 275,789  9/1951  Switzerland.

WILLIAM J. STEPHENSON, *Primary Examiner.*

MICHAEL V. BRINIDISI, MARCUS U. LYONS, *Examiners.*

L. S. SQUIRES, *Assistant Examiner.*